UNITED STATES PATENT OFFICE 2,592,173

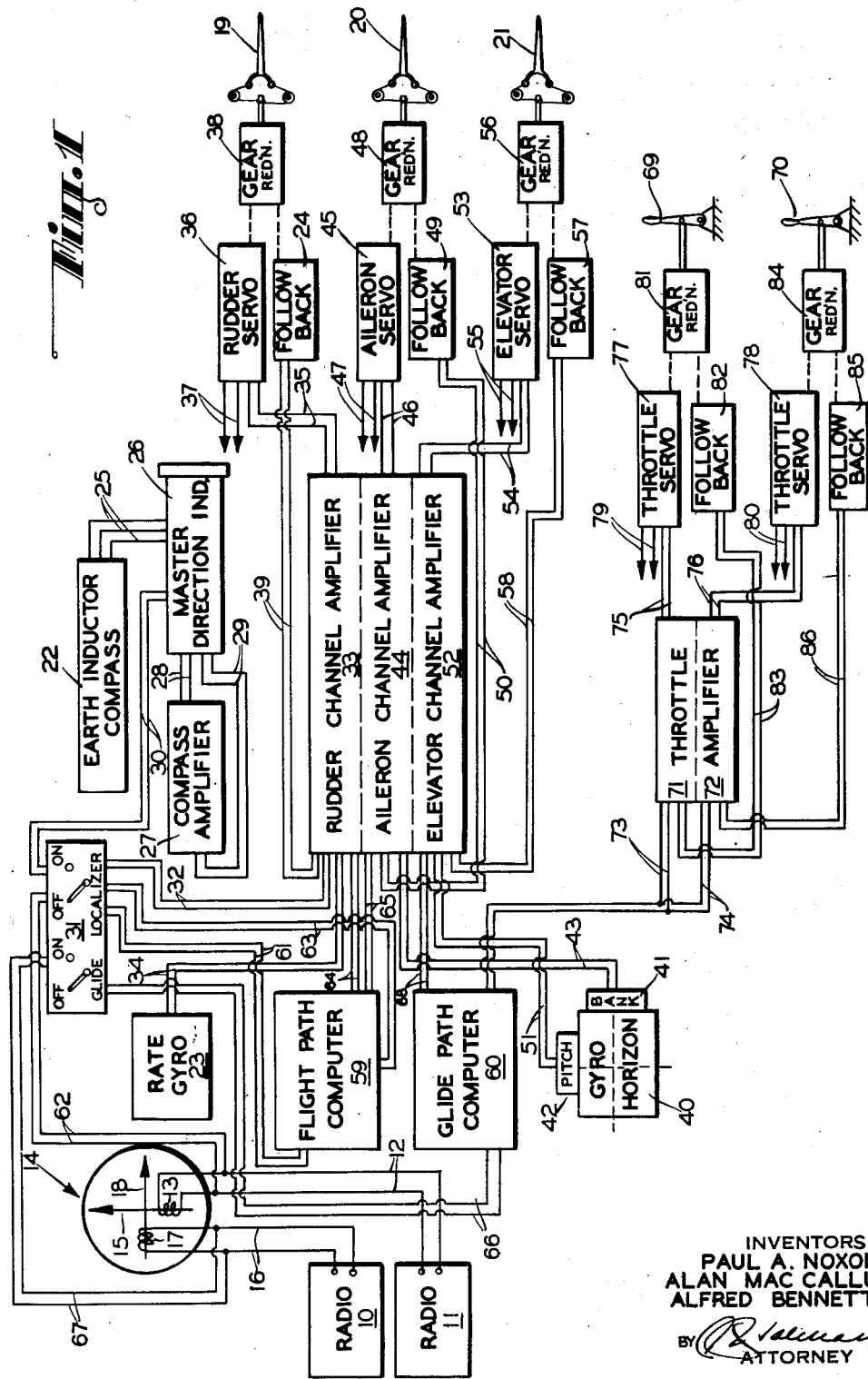

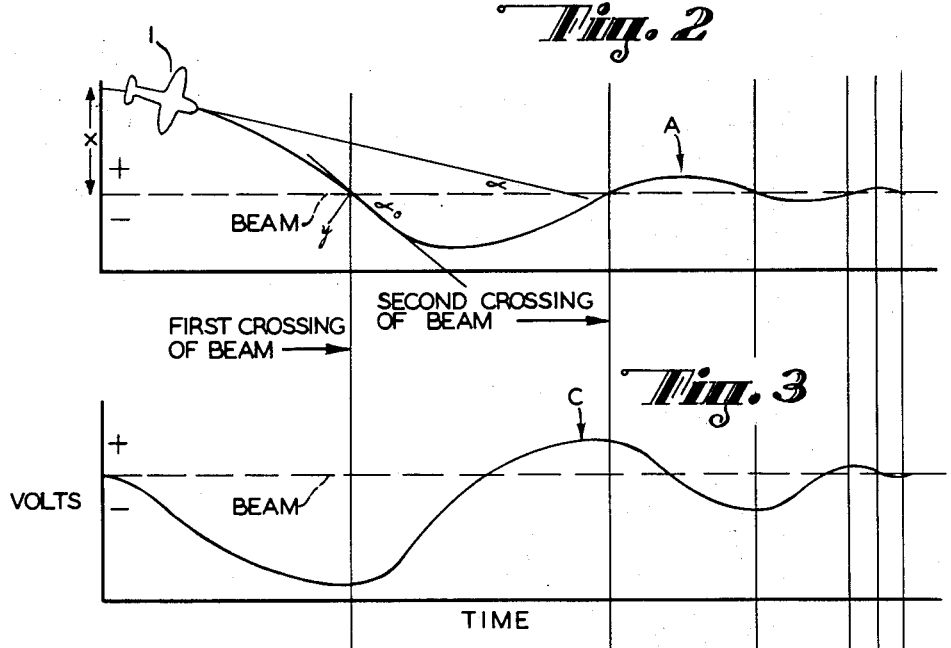
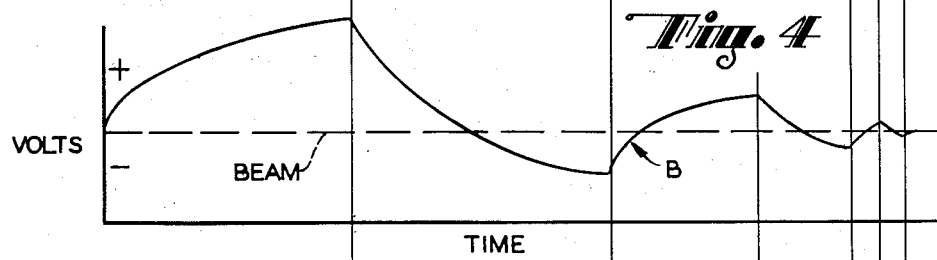
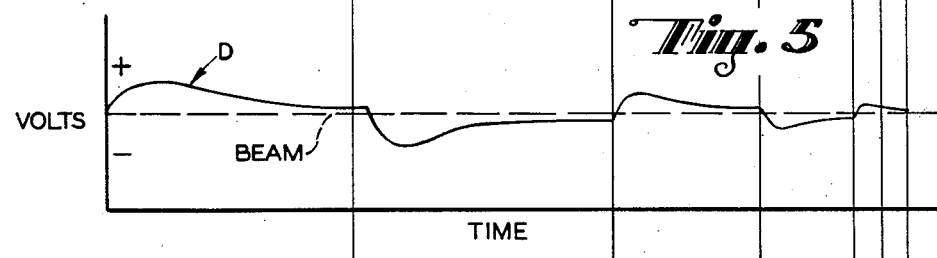

AUTOMATIC CONTROL OF MOBILE CRAFT

Paul A. Noxon, Tenafly, and Alan M. MacCallum, Maywood, N. J., and Alfred Bennett, Bronx, N. Y., assignors to Bendix Aviation Corporation, Teterboro, N. J., a corporation of Delaware Application October 25, 1946, Serial No. 705,524

32 Claims. (Cl. 244—77)

The present invention relates generally to the control of aircraft in attitude and direction and more particularly to a novel method of and apparatus for automatically guiding a craft in both horizontal and vertical planes to a desired landing field or runway in accordance with radio signals transmitted from the field.

Systems, heretofore known, of this general character usually employ at the radio receiver output a cross pointer indicator which consists of a normally vertical localizer pointer and a normally horizontal glide path pointer, where course and attitude errors appear, respectively, as D. C. voltages across the terminals of the two pointers. These voltages are utilized to order the flight path of the craft in the horizontal plane as called for by the localizer signals and in the vertical plane as called for by the glide path signals.

Known control systems making use of such error voltages have treated them as displacement functions plus the time derivatives thereof. Systems based on this concept, therefore, have certain inherent disadvantages. First of all, the error signal derived from the radio system represents not a linear displacement from the desired flight path but rather the angle subtended between the flight path and a line drawn from the craft to the transmitting station. Hence, unless range factor is employed, widely differing time constants will appear at different ranges giving rise to either low sensitivity at a relatively remote point from the runway or instability as a result of overcontrol at a point relatively near the runway. Secondly, due to reflections from terrestrial objects, the flight path set up by the radio equipment is never a truly straight line but contains many bends of varying amplitude and length. Derivative systems will, therefore, tend toward amplifying such bends and create disturbances in the flight path of the craft out of all proportion to the actual amplitude of the bends themselves. Furthermore, if attempts are made to produce a more nearly rectilinear radio path by higher radio frequencies and more highly directional systems, there invariably appear regions not far from the flight path having voltage gradients which drop instead of rise, causing derivative systems to read the wrong algebraic sign and hence produce instability rather than damping.

The present invention overcomes the limitations of prior art arrangements by rejecting proportionality constants and recognizing only the algebraic sign of the error signals and, further, employing a time integral to order a heading or glide angle of the craft, the time integral of the error signal being accomplished in such a manner as to provide damping.

An object of the present invention, therefore, is to provide a novel control for an aircraft in automatic approach to a desired destination from existing localizer and glide path radio systems.

Another object of the present invention is to provide a novel automatic approach control system for aircraft for directing the craft automatically toward and onto a desired runway, the system being responsive to the polarity of the incoming radio signal and the time of persistence thereof rather than the amplitude of the radio signal as heretofore.

A further object is to provide a novel apparatus comprising two units, one of which will automatically control an aircraft along a visual range beam, while both will act together to control the craft in two planes for automatic landing thereof.

Another object is to provide a novel flight path computer unit for automatically controlling the rudder and ailerons of an aircraft to maintain the flight of the latter along a desired radio beam.

A further object is to provide a novel glide path computer unit for automatically controlling the elevator and throttles of an aircraft for automatically guiding it along a vertically inclined beam toward a runway.

Another object is to provide a novel automatic approach system which in response to radio beams provides a constant magnitude signal which is integrated with respect to time so that the longer an aircraft is away from one or both of the beams the greater will be the control signal developed for returning the craft to the beam.

A further object of the present invention is to provide an automatic approach system for aircraft of the character described with a novel feed-back arrangement whereby the craft is returned more rapidly to a desired beam.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views, Figure 1 is a block diagram illustrating the various connections of the novel automatic approach control system hereof with an aircraft automatic pilot;

Figures 2 to 5, inclusive, are graphic illustrations representing craft flight path and the voltage outputs of the compass and integration devices as well as the voltage input into the automatic pilot channels;

Figure 6:
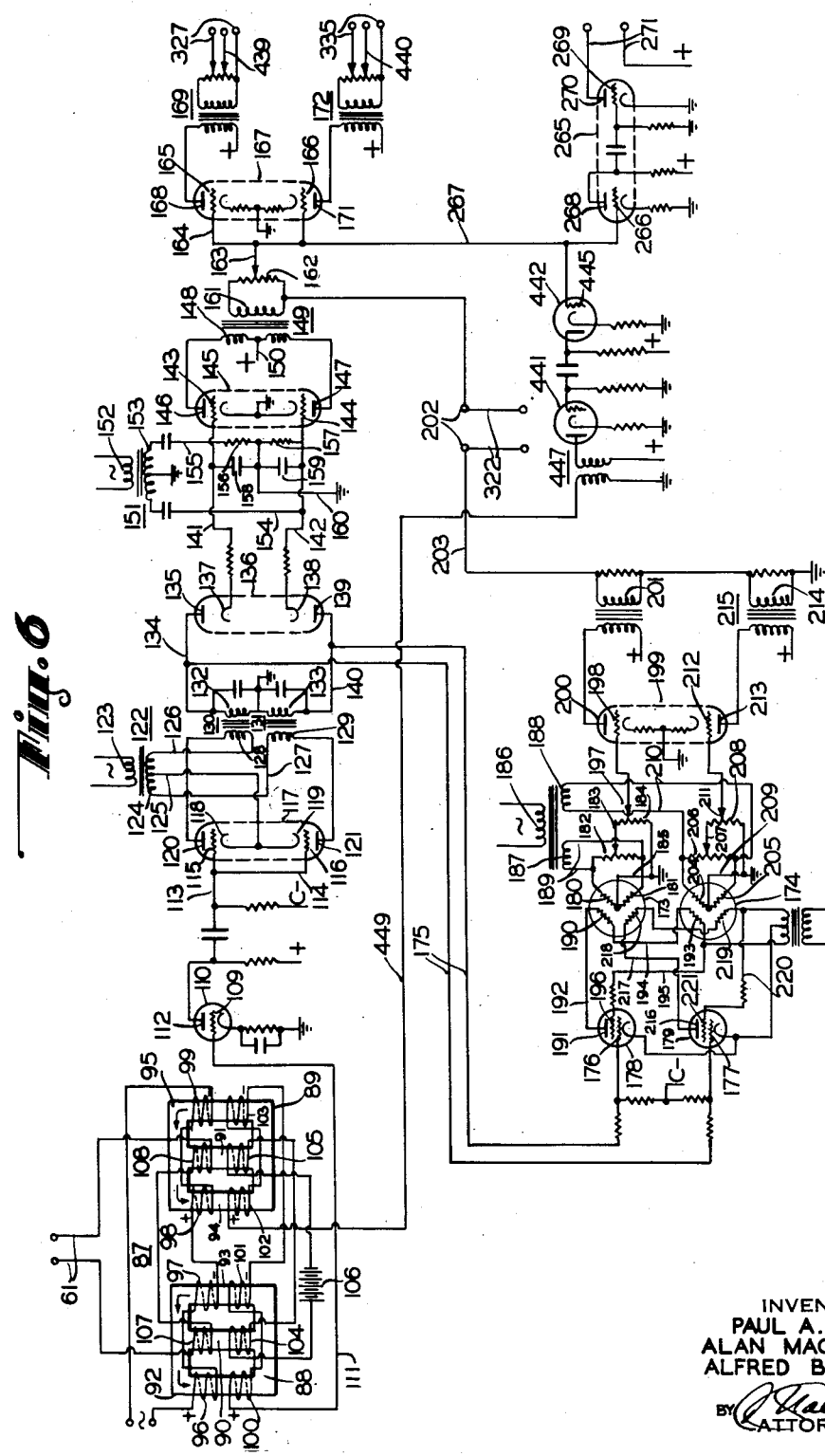
Figure 6 is a wiring diagram of the novel flight path computer unit of the present invention.

The novel automatic approach control system of the present invention is designed to operate with conventional localizer and glide path transmitters located at an airport to which the craft is heading. The localizer transmitter is generally located at the far end of the runway and radiates a radio pattern consisting of two overlapping lobes, one of the lobes being modulated at a frequency of 90 cycles and so arranged as to represent the left hand field of the localizer pattern and the other of the lobes being modulated at a frequency of 150 cycles so arranged as to represent the right hand field of the localizer pattern. A line drawn through the center of the overlaps of each pair of lobes defines an imaginary straight line down the center of the runway and out into space for some distance. The glide path transmitter, like the localizer transmitter, radiates a radio pattern consisting of two overlapping lobes modulated in a manner similar to the localizer except that the glide path lobes are stacked in a manner to provide vertical guidance of the craft, that is, a line drawn through the center of the overlaps of each pair of the latter lobes will define an imaginary straight and inclined line out into space from the runway.

For guiding an aircraft to the landing field in accordance with both the localizer and glide path beams, conventional radio receivers, designated generally with the reference characters 10 and 11 in Figure 1 of the drawings, are mounted on the craft, the former receiving the vertical guidance signals from the glide path transmitter and the latter receiving the lateral guidance signals from the localizer transmitter. In a known manner, receiver 11 develops at its output a direct current flowing in one direction, assuming the craft to be to the left of the localizer beam, and in an opposite direction when the craft is to the right of the localizer beam. Such direct current is communicated from the output of receiver 11 by way of conductors 12 to energize a coil 13 of a conventional cross pointer indicator 14, a vertical pointer 15 being inductively coupled with the coil to move in a clockwise direction from a normally central vertical position when the craft is to the left of the localizer beam and in a counterclockwise direction when the craft is to the right of the localizer beam, it being understood that pointer 15 maintains a normally centered vertical position when the craft is directly on the localizer beam at which time no current flows in coil 13.

In a similar manner, receiver 10 develops at its output a direct current flowing in one direction, assuming the craft to be above the glide path beam, and in an opposite direction when the craft is below the glide path beam. The direct current so developed is communicated from the output of receiver 10 by way of conductors 16 to energize a second coil 17 of indicator 14, a normally horizontal pointer 18 being inductively coupled with the latter coil to move upward from its normally horizontal position when the craft is below the glide path beam and downward when the craft is above the latter beam, it being understood that pointer 18 maintains a normally centered horizontal position when the craft is directly on the glide path beam at which time no current flows in coil 17. So long as both pointers 15 and 18 maintain their normally centered position as illustrated in Figure 1, no current will be present in either coil 13 or 17 and the pilot will be advised that the craft is headed on the localizer beam and down the glide path beam.

As will now be understood, the only information which the radio beams actually present are the angles between the lines from the craft to the transmitters and the axes of the beams, and not craft lateral distances from the axes of the beams, regardless of the distance of the craft from the transmitters. It is possible, and it has been proposed, to control a craft using such angular information and its derivatives only, but as the craft approaches the landing field, the sensitivity of the system changes, since the same angular error from the beam axis close to the landing field represents a smaller actual distance from the beam than the same angular error farther out from the field. Hence, it takes the craft less time to reach the beam from a given angular displacement close to the field than it does when the craft is some distance from the field. In order to obtain proper control all along the flight path it is necessary with displacement systems to continuously vary the ratio between the control applied and the angular error calling for the control, in accordance with the distance from the field. Moreover, the utilization of straight displacement and derivative systems implies a rapid response to the beams which may be dangerous when the beams are suddenly deflected or bend sharply.

Coming now to the novel automatic control system of the present invention, the known limitations inherent in displacement control systems have been eliminated by making the system hereof sensitive to the craft direction of displacement, rather than the angle of displacement, and the length of time that the craft is away from one or the other or both of the beam axes. The signals developed in the system of the present invention for operating the craft control surfaces are therefore not a function of the angle of craft displacement from the axes of the beams but depend upon the polarity of the radio signal or signals received during the displacement and upon the time of persistence thereof.

Referring now to Figure 1 of the drawings, the novel range and automatic approach controls hereof are illustrated in a general manner, for a better understanding of the present invention, in their connection with an all electric automatic pilot, which may be of the character described and claimed in copending application Serial No. 516,488, filed December 31, 1943, the automatic pilot normaly controlling craft rudder, aileron and elevator surfaces 19, 20 and 21, respectively.

As more fully described in aforesaid application Serial No. 516,488, rudder 19 is automatically controled in accordance with a heading or compass signal developed by an earth inductor compass 22, a rate signal developed by a rate of turn gyroscope 23 and an electrical follow-back signal developed by a follow-back device 24. As is known, compass 22 develops a signal proportional to the amount of angular displacement of the craft from a prescribed heading which is fed by way of leads 25 to the stator of an inductive device, located within a master direction indicator 26, which induces a signal in the rotor of the device that is fed to the input of a vacuum tube amplifier 27 by way of leads 28, the amplifier output being connected by way of leads 29 to energize a two-phase motor, within indicator 26, which operates not only to return the rotor of the inductive device to a null but also to move a pointer or scale relative to a fixed index to show the new heading as well as a transmitter device, located within indicator 26, which, when actuated by the motor, communicates by way of leads 30, a selector switch 31 and leads 32 to the input of a rudder channel amplifier 33, a signal proportional to the amount of craft departure from the prescribed course.

Fed into the input of the rudder channel of amplifier 33, in series with the compass signal is a rate signal which is developed by rate gyroscope 23 and its associated take-off, the latter being connected by way of leads 34 to the input of the rudder amplifier, the output of which is fed by way of leads 35 to energize the variable phase of a two phase rudder servomotor 36, the fixed phase of which is energized by a suitable source of A. C. current (not shown) by way of leads 37. Upon energization, motor 36 displaces rudder 19 through a speed reduction gear system 38 to return the craft to its prescribed course, the motor also operating inductive follow-back device 24 which develops an electrical follow-up signal communicated by leads 39 to the input of the rudder amplifier to be there impressed in series with the displacement and rate signals for rudder control.

For craft attitude control, a gyro horizon 40 is provided having bank and pitch take-offs 41 and 42, respectively, the former having an electrical signal developed therein in response to craft bank which is fed by way of leads 43 to the input of an aileron channel amplifier 44, the output of the latter energizing the variable phase of a two phase aileron servomotor 45 by way of leads 46, the fixed phase of which is energized from a suitable source of A. C. current (not shown) by way of leads 47. Upon energization, motor 45 displaces aileron 20 through a gear reduction system 48 to re-establish level craft attitude and at the same time operates an inductive follow-back device 49 which develops an electrical follow-up signal that is communicated to the input of the aileron amplifier by way of leads 50 to be there impressed on the bank signal for aileron control.

Pitch take-off 42, on the other hand, has an electrical signal developed therein in response to a craft climb or dive which is fed by way of leads 51 to the input of an elevator channel amplifier 52, the output of the latter energizing the variable phase of a two phase elevator servomotor 53 by way of leads 54, the fixed phase of which is energized from a suitable source of A. C. current (not shown) by way of leads 55. Upon energization, motor 53 displaces elevator 21 through a gear reduction system 56 to re-establish level craft attitude and at the same time operates an inductive follow-back device 57 which develops an electrical follow-up signal that is communicated to the input of the elevator amplifier by way of leads 58 to be there impressed on the pitch signal for elevator control. The pilot system, generally described herein, therefore, is adapted for automatically controlling the various craft surfaces in accordance with a predetermined course and attitude and, where an automatic turn control provision is required for the system, the turn controller unit of copending application Serial No. 665,918, filed April 29, 1946, may be utilized. The pilot system, therefore, controls the craft in azimuth and attitude in conformance with signals preselected by the human pilot but for range flying or automatic approach and landing control the pilot system is made responsive to radio beams emanating from a ground station.

When the craft is to be taken in for a landing and is at that time displaced some distance from the localizer beam, for example, the problem, mathemtically, is one of determining the heading of the craft which will bring the craft on to the beam in the most gradual manner consistent with its distance from the beam and with a minimum of oscillations relative to the beam once the beam has been crossed.

It may be assumed, for example, that craft 1, of Figure 2 is at some distance $x$ to the left of the beam there shown in broken lines and that it is approaching the beam at a constant velocity V, with its heading with respect to the beam as the angle $\alpha$, in which event the heading of the craft at any point $x$ may be written as $$\frac{dx}{dt} = V \sin \alpha \qquad (1)$$

For small values of the angle $\alpha$ the sine of the angle approaches the angle, permitting the Equation 1 to be written as $$\frac{dx}{dt} = V\alpha \qquad (2)$$

which represents the change in heading.

Differentiating Equation 2

$$\frac{d^2x}{dt^2} = V\frac{d\alpha}{dt} \qquad (3)$$

which represents the rate of change in heading.

Inasmuch as the function of the time duration of the displacement is of interest and not the function of displacement, $$\frac{d\alpha}{dt}$$

may be assumed to be equal to $-Kt^b$. The primitive may then be written as $$\frac{d^2x}{dt^2} = -VKt^b \qquad (4)$$

By integration $$\frac{dx}{dt} = \frac{-KVt^{(b+1)}}{(b+1)} + C \qquad (5)$$

The integration constant C is assumed to be the slope $V\alpha_0$, the first crossing of the beam, or $$\frac{dx}{dt} = \frac{-KVt^{(b+1)}}{(b+1)} + V\alpha_0 \qquad (6)$$

By a second integration, $$X = \frac{-KVt^{(b+2)}}{(b+1)(b+2)} + V\alpha_0 t + C_1 \qquad (7)$$

the integration constant $C_1$ being $X_0$ a point on the curve. Thus, $$X = X_0 + V\alpha_0 t - \frac{VKt^{(b+2)}}{(b+1)(b+2)} \quad (8)$$

and when $X=0$, $$0 = 0 = V\alpha_0 t - \frac{VKt^{(b+2)}}{(b+1)(b+2)} \quad (9)$$

Solving Equation 9 for $t$, $$\alpha_0 = \frac{VKt^{(b+2)}}{(b+1)(b+2)Vt}$$

$$t = \left[\frac{(b+1)(b+2)\alpha_0}{K}\right]^{\frac{1}{b+1}}$$

Substituting for $t$ in Equation 6

$$\frac{dx}{dt} = KV\left[\frac{(b+1)(b+2)\alpha_0}{K(b+1)}\right] + V\alpha_0$$

$$= -V\alpha_0(b+2) + V\alpha_0$$

$$= -V\alpha_0(b+1) \quad (10)$$

From Equation 2

$$\frac{dx}{dt} = V\alpha = -V\alpha_0(b+1)$$

or $$\frac{\alpha}{-\alpha_0} = (b+1) \quad (11)$$

Letting the nominal slope value equal $a$, and substituting in Equation 6

$$\frac{dx}{dt} = V\alpha_0 - \frac{KVt^a}{a} \quad (12)$$

or $$\frac{dx}{dt} = V\alpha = V\alpha_0 - \frac{KVt^a}{a}$$

$$\alpha = \alpha_0 - \frac{Kt^a}{a} \quad (13)$$

From the foregoing Equation 13 it is apparent that in order to reduce the heading angle relative to the beam to zero, that is, to maintain the craft on the desired beam, requires a displacement signal as well as a time signal having an exponential factor. In the novel system of the present invention, the displacement signal ($\alpha_0$) is satisfied by the error voltage developed by the compass, while the time signal $$\frac{(Kt^a)}{a}$$

algebraically added to the displacement signal is satisfied by the voltages developed in novel time networks to be more fully described hereinafter. Empirically, it has been found that where the exponent $a$ substantially approximates one-half, the most desirable results are obtained, the craft crossing and recrossing the desired beam and then settling on the course in a path substantially as that indicated by curve A of Figure 2.

The time signals (localizer and glide path) referred to above, are developed by novel flight path and glide path computer units generally designated with the reference characters 59 and 60, respectively, in Figure 1. These computer units per se are the subject matter of divisional application Serial No. 202,552, filed December 23, 1950. As generally shown in the latter figure, the input of the flight path computer unit is connected by way of leads 61, switch 31 and leads 62 with radio output leads 12 so that when switch 31 is turned to call for localizer control the direct current energizing coil 13 of the cross-pointer indicator will likewise be communicated to the input of unit 59, the output of the latter, including the compass signal which at that time is fed through switch 31 to unit 59 by way of leads 63 (in a manner to be more fully described hereinafter), being fed into the rudder and aileron amplifier channels 33 and 44 by way of leads 64 and 65, respectively.

The input of the glide path computer unit, on the other hand, is connected by way of leads 66, switch 31 and leads 67 with radio output leads 16 so that when switch 31 is actuated to call for glide path control the direct current energizing coil 17 of the cross-pointer indicator will likewise be communicated to the input of unit 60. The output of the latter is split so that a part of the signal is fed into the input of elevator channel amplifier 52 by way of leads 68 for elevator control and another part of the signal is utilized for engine throttle control. In the drawing of Figure 1, the control is illustrated with a twin-engined craft provided with throttle control levers 69 and 70, each of which is provided with its own amplifier channel 71 and 72, each channel being generally similar to any of amplifier channels 33, 44 and 52 which are shown in greater detail in the aforementioned copending application Serial No. 516,488. A part of the output signal of unit 60 is, therefore, fed into amplifier channels 71 and 72 by way of leads 73 and 74, respectively, and the amplifier outputs are communicated by way of leads 75 and 76 to the variable phases of two phase induction throttle servo motors 77 and 78, the fixed phases of which are connected to a suitable source of A. C. current (not shown) by way of leads 79 and 80. Upon energization, motor 77 displaces lever 69 to full throttle or retarded throttle position through a gear reduction system 81, the motor also operating an inductive follow-back device 82 which develops an electrical follow-up signal that is communicated to the input of amplifier 71 in series with the signal of unit 60 by way of leads 83. Motor 78, on the other hand, when energized displaces lever 70 to full throttle or retarded throttle position through a gear reduction system 84, the motor also operating an inductive follow-back device 85 which develops a follow-up signal that is communicated to the input of amplifier 72 in series with the signal of unit 60 by way of leads 86.

On automatic approach, therefore, the craft rudder is automatically actuated in accordance with heading, rate of change of heading, follow-up and flight path computer signals while aileron control is automatically effected through heading, bank, follow-up and flight path computer signals so that the craft is directed to the localizer beam along a path substantially as that represented by curve A of Figure 2. Craft elevator, on the other hand, is automatically controlled in accordance with pitch, follow-up and glide path computer signals while the throttles are automatically controlled in accordance with glide path and follow-up signals whereby the craft is directed to the vertical or glide path beam for landing along a path also generally similar to that represented by curve A of Figure 2.

Referring now to Figure 6 of the drawings for a more detailed description of the novel flight path computer unit of the present invention, designated generally with the character 59 in Figure 1, which develops the required time signal discussed above for directing the craft on to the localizer beam along the path represented by curve A of Figure 2, the unit as shown includes an electrical device 87 which is adapted for developing a reversible and workable A. C. signal from a relatively weak D. C. signal supplied thereto from radio receiver 11.

Device 87 comprises two permeable cores 88 and 89, each being provided with center legs 90, 91 and spaced outer legs 92, 93 and 94, 95. The outer legs are provided with primary energizing windings 96, 97, 98 and 99 which are connected in series aiding relation with each other and with a suitable source of A. C. current (not shown) and with secondary windings 100, 101, 102 and 103. Of the latter, windings 100, 101 are connected in series opposed relation with windings 102, 103. Center legs 90 and 91 are provided with a first pair of coils 104, 105 connected in series opposed relation with a battery 106 and a pair of series aiding control coils 107, 108 which are connected through leads 61 (Figure 1) to be energized by the current flowing in cross-pointer coil 13 when the craft is to the left or right of the localizer beam. So long as no direct current flows in control coils 107, 108 the system is electrically balanced and nothing appears at the secondary outputs. As soon, however, as the craft departs from the flight path, a direct current flows in the control coils in one direction or another depending upon the direction of craft departure from the beam whereupon device 87 is unbalanced and develops at the secondary windings an A. C. signal with reversing phase and varying amplitude. For a more detailed description of the operation of device 87 reference is made to copending application Serial No. 700,234, filed September 30, 1946.

The A. C. signal developed at the output of secondary windings 100, 101, 102 and 103 is fed to a grid 109 of a vacuum tube 110 by way of a lead 111 where it is amplified, the tube having a plate 112 connected by way of leads 113, 114 with grids 115, and 116 of a discriminator tube 17, the latter operating at its saturation point and having cathodes 118, 119 and plates 120, 121. A. C. potential is applied to plates 120, 121 from a plate supply transformer 122 having a primary 123, energized from a suitable source of A. C. current, and a secondary 124 which is connected at a center tap thereof with the cathodes by way of a lead 125 and at its outer ends with plates 120, 121, respectively, by way of leads 126 and 127 and primary windings 128, 129 of a pair of transformers 130 and 131, the latter being the plate loads.

The sensitivity of the system is such that tube 110 reaches saturation when the craft is off the beam a very small amount and discriminator tube 117 is normally biased to cut-off so that with zero signal (when the craft is on the beam) no voltage is present in secondaries 132, 133 of transformers 130 and 131. When an A. C. voltage, however, is impressed on grids 115 and 116 of tube 117, i. e., when the craft deviates from the beam, the upper or lower portion of the tube becomes conductive depending upon the polarity of the impressed signal, the polarity of the signal, on the other hand, being determined by the direction of craft displacement from the beam.

Assuming, for example, that the upper portion of tube 117 becomes conductive, an A. C. signal will be present at plate 120 which will appear at secondary 132 of transformer 130 and will be communicated therefrom by way of a lead 134 to a plate 135 of a dual rectifier tube 136 having cathodes 137, 138 and a second plate 139, the latter being connected by way of a lead 140 with secondary 133 of transformer 131.

The output of the rectifier is connected by way of conductors 141 and 142 with the grids 143, 144 of a dual tube 145 having plates 146 and 147 which are connected with the free ends of a split primary winding 148 of a transformer 149, the winding being centrally tapped to a B supply by way of a lead 150. Tube 145 is provided with a normal negative cut-off bias. Grids 143, 144 are connected to an A. C. grid supply comprising a transformer 151 having a primary winding 152, energized from a suitable source of A. C. current, and a secondary winding 153 connected to the grids through conductors 154 and 155.

Interposed between the grids of tube 145 and the rectifier output is a time delay arrangement having a rapid time constant to the end that the automatic approach system will not be oversensitive and apply control to the craft in response to minute departures, the network from the rectifier output thus constituting a rapid transient integrator. To this end, an RC circuit is provided comprising resistors 156 and 157 interposed between conductors 141 and 142 and condensers 158 and 159 connected across the latter conductors, the resistors and condensers being grounded by way of a lead 160.

Referring now to the example assumed above, the direct current flowing in conductor 141, instead of being immediately impressed on grid 143 of tube 145, is delayed inasmuch as it must first charge condenser 158 the rate of charging being controlled by a resistor interposed in lead 141. This charge supplies the necessary bias for grid 143 whereupon tube 145 becomes conductive and a signal appears at plate 146 and at winding 148. This signal persists in winding 148 until the charge on condenser 158 leaks through resistor 156 to ground.

A mixing circuit including a secondary winding 161 and a resistor 162 connected across its ends receives the signal from primary winding 148 and through an adjustable contact 163 communicates the signal by way of a lead 164 to the grids 165 and 166 of a dual amplifier tube 167, plate 168 of the tube feeding a signal into the rudder channel amplifier 33 by way of a transformer 169 whose secondary is provided with suitable connections, to be hereinafter described, to leads 64 for connection with the rudder amplifier and plate 171 of the tube feeding a signal into the aileron channel amplifier 44 by way of a transformer 172 whose secondary is provided with suitable connections, to be hereinafter more fully described, to the leads 65 for connection with the aileron amplifier. The arrangement thus far described takes care of any rapid transients, say, for example, on the order of .5 second, and the same signal from computer 59 that controls rudder 19 also controls aileron surfaces 20 to thereby provide coordinated turn of the craft to return it on to the beam. At the same time a signal from compass 22 is also fed to the mixing circuit to be added algebraically with the signal of tube 145 by way of leads 63.

For transients that persist over a longer period of time, additional time delay devices in the nature of thermal delay relays or tubes 173 and 174 are provided having differing time constants. For example, device 173 may have a time constant of thirty (30) seconds while device 174 may have a time constant of four (4) minutes.

For a more detailed description of the nature and operation of such thermal delay devices reference is made to copending application Serial No. 562,826, filed November 10, 1944, now U. S. Patent No. 2,463,805, issued March 8, 1949.

In the event that craft displacement from the beam represents a distance in time exceeding .5 second, a signal is picked up from either plate 135 or 139 of tube 136 by way of conductors 175, which are tapped to leads 134 and 140, and fed to the grid 176 or 177 of a second discriminator tube, shown in Figure 6 as two separate tubes 178 and 179, whose action is similar to that of tube 117 in that either tube 178 or 179 becomes conductive depending upon the polarity of the signal impressed on grids 176 and 177 by conductors 175.

Thermal delay device 173 comprises a sealed tube having mounted therein a pair of resistors 180 and 181 constituting two arms of a Wheatstone bridge, the remaining arms being outside of the tube and comprising a split-resistor 182 which is center tapped by a conductor 183, the latter connecting through a resistor 184 with a ground conductor 185 which is connected to the junction of arms 180 and 181, conductors 183 and 185 defining the output of the bridge when the latter is unbalanced. Bridge energization is obtained from a suitable A. C. source by way of a transformer having a primary 186 and two secondaries 187, 188, secondary 187 being connected to an opposite diagonal of the bridge by way of leads 189. A resistor 190 is arranged in heat exchange relation with bridge resistor 180 and is connected in series with a plate 191 of tube 178 by way of a lead 192 and with a second resistor 193 by way of a lead 194, the free end of resistor 193 being connected by way of a lead 195 with a screen grid 196 of tube 178.

Following the example through, which has been assumed above, in response to a craft departure from the beam exceeding .5 second, an A. C. signal flows at plate 191 of tube 178 and is fed to resistor 190 which after a given period of time (30 seconds) heats up to change the value of bridge resistor 180 to unbalance the bridge and provide current flow in one direction at adjustable contact 197 which is fed to a grid 198 of a dual amplifier tube 199, the signal appearing at a plate 200 of the tube which is connected with a transformer whose secondary 201 is connected in series with the compass signal fed into terminals 202 by way of suitable connections, to be hereinafter described, and with the mixing circuit by way of a lead 203 so that the signal of device 173 aids the signal of tube 145 and both are added algebraically with the compass signal for controlling rudder and aileron craft surfaces.

If, on the other hand, craft displacement from the beam exceeds in distance a time of four (4) minutes, second resistor 193 will heat up and because of its heat exchange relation with a resistor 204 change the value of the latter. Resistor 204 constitutes one arm of a bridge circuit and it together with an adjoining resistor 205, defining the second arm of the bridge, is located within device 174, the remaining two arms of the bridge being constituted by a resistor 206 which is centrally tapped by a conductor 207, the latter being connected through a resistor 208 with a grounded lead 209 connected to the juncture of arms 204 and 205, conductors 207 and 209 defining the bridge output. Bridge energization is obtained from secondary 188 which is connected across an opposite diagonal of the bridge by way of leads 210.

The signal resulting from the unbalance of the bridge of device 174 is communicated by way of an adjustable contact 211 to a grid 212 of tube 199 whereby a signal is developed at a plate 213 of the tube and communicated therefrom through the secondary windings 214 of a transformer 215 to be impressed in series with the signal of device 173.

In the event that the polarity of the signal fed by leads 175 to the grids 176 and 177 is changed so that tube 179 becomes conductive rather than tube 178, an A. C. signal will appear at plate 216 of tube 179 and will be communicated by lead 217 to a third resistor 218 arranged in device 173 in heat exchange relation with bridge arm 181 so that after a period of thirty (30) seconds the value of resistor 181 will change to unbalance the bridge and provide reverse current flow at contact 197. Resistor 218 is connected in series with a further resistor 219 arranged in device 174 in heat exchange relation with bridge arm 205 so that after a period of four (4) minutes, assuming, of course, the signal to be present at plate 216, the bridge is unbalanced and reverse current flow occurs at contact 211. The free end of resistor 219 is connected by way of a lead 220 with a screen grid 221 of tube 179.

Where the circuit including the output of rectifier 136 and tube 145 has been termed as a rapid transient integrator, the circuit including thermal delay devices 173 and 174 may be termed a slow transient integrator.

If, for some reason, the craft 1 of Figure 2 is away from the beam axis (which may be considered to be the localizer beam) and flight path computer 59 is in circuit with the automatic pilot, radio 11 will develop a direct current of a given direction in coil 13 which is also communicated to control coils 107 and 108 of device 87 of the computer. As a result of D. C. flow in the control coils, an A. C. signal appears at the output of secondaries 100, 101, 102 and 103 and at grid 109 of tube 110 which is then amplified and fed to discriminator tube 117. Depending upon the direction of current flow in control coils 107 and 108, either the upper or lower portion of tube 117 becomes conductive and since it operates at its saturation point, a constant magnitude signal is applied to the integrating devices. As the time of the constant magnitude signal increases, a control signal is first developed at the output of tube 145, a second control signal is subsequently developed by thermal delay device 173 to act with the first signal and, finally, a third signal is developed by thermal delay device 174 which is added with the first two signals. The three integration devices, therefore, produce a resultant voltage that is the time integral of the constant magnitude signal at the output of discriminator tube 117.

If the craft has been some distance from the beam but flying a course parallel with the beam no rudder control is effected by the compass, the latter being satisfied. However, as soon as flight path computer unit 59 is electrically connected with the automatic pilot, the resultant voltage developed by the integration devices actuates the rudder and aileron surfaces to turn the craft in a direction that will bring it to the beam axis, the rate of turn being dependent upon the magnitude of the voltage developed by the integration devices, the magnitude of the voltage, in turn, being dependent upon the time that the craft has been away from the beam axis after the flight computer has been connected with the automatic pilot.

As soon as the craft turns toward the beam, compass 22 develops a signal which is opposite to the resultant voltage of the integration devices and the two operate in unison on the rudder and ailerons so that the degree of turn of the craft from its original heading is made proportional to the voltage from the integration devices. As time passes, the voltage from the latter devices builds up from zero, as shown graphically by curve B of Figure 4, and becomes larger and larger as the fixed input signal from discriminator 117 is integrated and the craft change in heading toward the beam from the original course becomes larger and larger. By the same token, as the craft turns toward the beam the signal of compass 22 builds up from zero, in an opposite direction, as shown graphically by curve C of Figure 3 of the drawings. The compass signal of Figure 3 and the signal of the integration devices when added algebraically, provide an input signal into the rudder and aileron channels of the automatic pilot of a character such as that represented graphically by curve D of Figure 5, this latter signal determining the rate of turn ordered.

Since the craft is flying at a definite speed and is turning toward the axis of the beam, it will eventually intersect the beam at a point y (Figure 2) at which time the voltage of the integration devices will be at a maximum as shown in Figure 4 and the compass signal also will be at its maximum value as shown in Figure 3. At some point after the first crossing of the beam these voltages are equal and opposite so that rudder will be centered. The instant the beam is reached, the D. C. signal in coil 13 of the cross pointer drops to zero as does the signal in control coils 107 and 108 of device 87 whereupon the signal of the integration devices starts to decay and drop toward zero as shown in Figure 4. While the signal of tube 145 will drop to zero almost instantly, the signals of devices 173 and 174 will persist for a time because of the lag resulting from the cooling of resistors 190 and 193.

As the craft crosses the beam, however, a reversed direct current flows in coil 13 of the cross pointer indicator as well as in the control coils of device 87 whereupon the lower portion of discriminator tube 117 becomes conductive and a signal appears, after a delay resulting from the RC circuit, at plate 147 which is out of phase with the signal originally appearing at plate 146 of tube 145. The signal appearing at plate 147 is fed through tube 167 to the rudder and aileron channels for displacing the rudder and aileron surfaces in an opposite direction to turn the craft to the beam. At this point, the compass signal begins to drop toward zero as shown by curve C of Figure 3 while the decay of the signals of thermal devices 173 and 174 is speeded up by the signal appearing at plate 216 at tube 179.

Again, depending upon the length of time that the craft is displaced from the beam prior to its second crossing of the beam, a signal will be fed by way of conductors 175 to grid 177 of tube 179 and a signal will appear at plate 216 thereof which will be fed to resistor 218 to heat the latter and thereby unbalance the bridge of device 173 and, after a further lapse of time, assuming the second crossing not yet to have been made, resistor 219 will heat up to unbalance the bridge of device 174. While both bridges, in the latter case, will have a reversed current flow at their outputs to add with the output of tube 145, the full output of the bridges will not be available until the arms 180 and 204 thereof have cooled off entirely, that is, the signal appearing in both bridges due to the first unbalance has disappeared. Before this point is reached, however, the decaying signals and the new signals will be equal and opposite so that their algebraic output will be zero. This condition is illustrated in Figure 4 where curve B crosses the dashed line for the first time.

The new signals due to tube 145 and thermal devices 173 and 174 will finally prevail and build up to reverse rudder and aileron surfaces and cause the craft to turn toward and cross the beam the second time in the manner shown by curve A of Figure 2. If, after the second crossing, the craft again goes beyond the beam, the reverse operation of the various integration devices occurs as discussed above until the craft has assumed a ground track defined by the beam.

The integration of the constant magnitude signal of tube 117 is made non-linear in order that the motion developed by the craft may be damped. While a number of damped solutions exist, the one here chosen has the criterion that at each intersection of the craft with the beam axis the angle of intersection with the axis will be substantially one-half the angle of the preceding intersection. This leads to a motion which is a damped oscillatory wave of continuously increasing frequency. As the frequency of oscillation is increased, damping by the natural damping of the craft, and by rate device 23 increases, and the motion eventually becomes critically damped and oscillation ceases. In dead smooth air oscillation may cease after the first overshoot.

Flight path computer 59, hereinabove described, may be used for either automatically flying range or the localizer path while glide path computer unit 60 is adapted for flying glide path alone to bring the craft on to the runway. Except for the fact that no compass signal is required for flying, glide path computer unit 60 is substantially the same as computer 59 in structure and operation.

Figure 7:
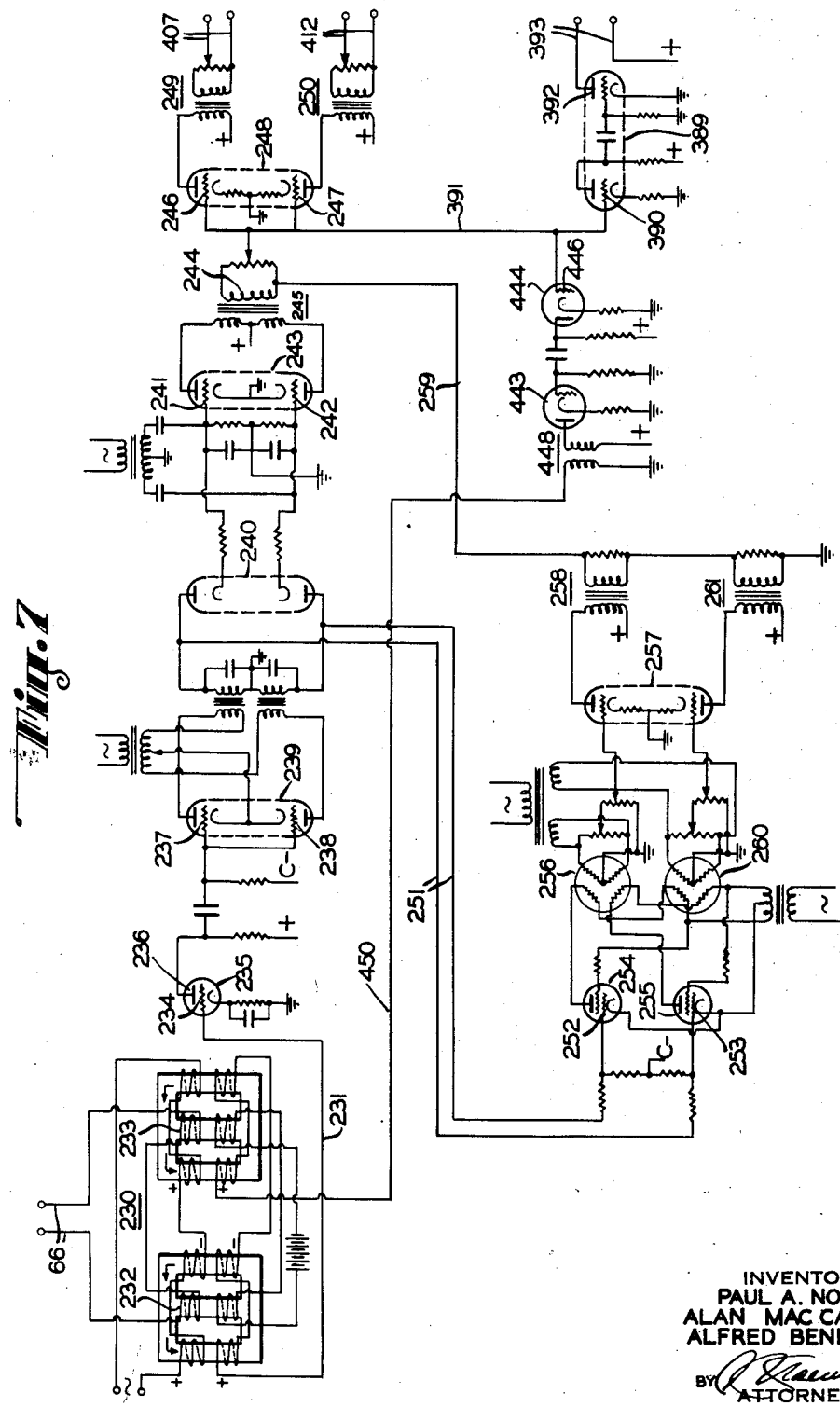
Figure 7 is a wiring diagram of the novel glide path computer unit of the present invention.

As shown in greater detail in Figure 7 of the drawings, computer 60 includes a device 230, similar to device 87 of Figure 6, for providing a workable and properly phased A. C. signal at an output lead 231 thereof in response to a direct current flow in control coils 232 and 233 thereof, the latter being connected by way of leads 66 and 67 (Figure 1) with coil 17 of the cross pointer indicator 14. Thus direct current will flow in control coils 232 and 233 in one direction when the craft is above the glide path beam and in a reverse direction when the craft is below the beam. Output lead 231 connects with grid 234 of a vacuum tube 235 where the signal is amplified, the plate 236 of the tube connecting with the grids 237 and 238 of a discriminator tube 239 and, depending upon the direction of D. C. flow in the control coils, either the upper or lower portion of tube 239 becomes conductive to pass a signal through a rectifier tube 240, the output of the latter being fed to grids 241 and 242 of a dual tube 243 through a time delay circuit, of the character described in connection with unit 59, having a time constant of about .5 second.

The signal appearing at one or the other of the plates of tube 243 is communicated through the secondary winding 244 of a transformer 245 to the grids 246 and 247 of an amplifier tube 248, the plates of which provide a signal through transformers 249 and 250 to the elevator and throttle amplifier channels 52, 71 and 72 through connections to be more fully described hereinafter.

Assuming only a slight deviation from the glide path beam, representing, for example, .5 second in distance from the beam, a signal will appear, properly phased, at either the upper or lower portion of tube 243 for controlling elevator surface 21 and throttle levers 69 and 70 to open or retarded position to return the craft to the beam.

Where the craft is away from the glide path beam for a time equal to or exceeding thirty (30) seconds, a part of the output signal is fed by way of leads 251 to either grid 252 or 253 of discriminator tubes 254 and 255 to unbalance the bridge of a first thermal delay device 256 whereby an A. C. current flows at its output and is fed through the upper portion of a tube 257, a transformer 258 and a lead 259 to be impressed in series with the signal of tube 243 for aiding in the operation of the elevator and throttles.

If, on the other hand, the craft is away from the glide path beam for a time equal to or exceeding four (4) minutes, the signal at either tube 252 or 253 will unbalance the bridge of a second thermal delay device 260 whereby an A. C. current will be caused to flow at its output and is fed through the lower portion of tube 257, a transformer 261 and lead 259 to be impressed in series with the first two signals fed into the input of tube 248 for elevator and throttle control. Thus, the further craft is from the glide path beam, either above or below it, the greater the resultant signal will be for controlling the elevator and throttles to direct the craft to the glide beam. Generally considered, the output of the three integration devices of the glide path computer take the form of curve B of Figure 4 in that the signal builds up from zero and attains its maximum value at the time that the craft returns to and crosses the beam for the first time. Thereafter, the signal begins to decay while a reverse signal is developed which finally becomes equal and opposite to the decaying signal and thereafter builds up in the opposite direction to reverse elevator and throttle control to direct the craft toward the beam along a path substantially as that represented by curve A of Figure 2.

While the compass signal utilized in connection with the flight path computer unit is not required in connection with the glide path computer unit, the latter on developing a control signal which actuates the elevator is opposed by a signal developed by the pitch take-off 42 of the artificial horizon, the latter taking the form of curve C of Figure 3 during the various headings of the craft, so that under certain conditions when the craft is returning to the beam the glide path signal and the pitch take-off signal will be equal and opposite at which time the elevator will be centered. This action is similar to that considered above in connection with the compass signals and the signals of the flight path computer.

Figure 8:
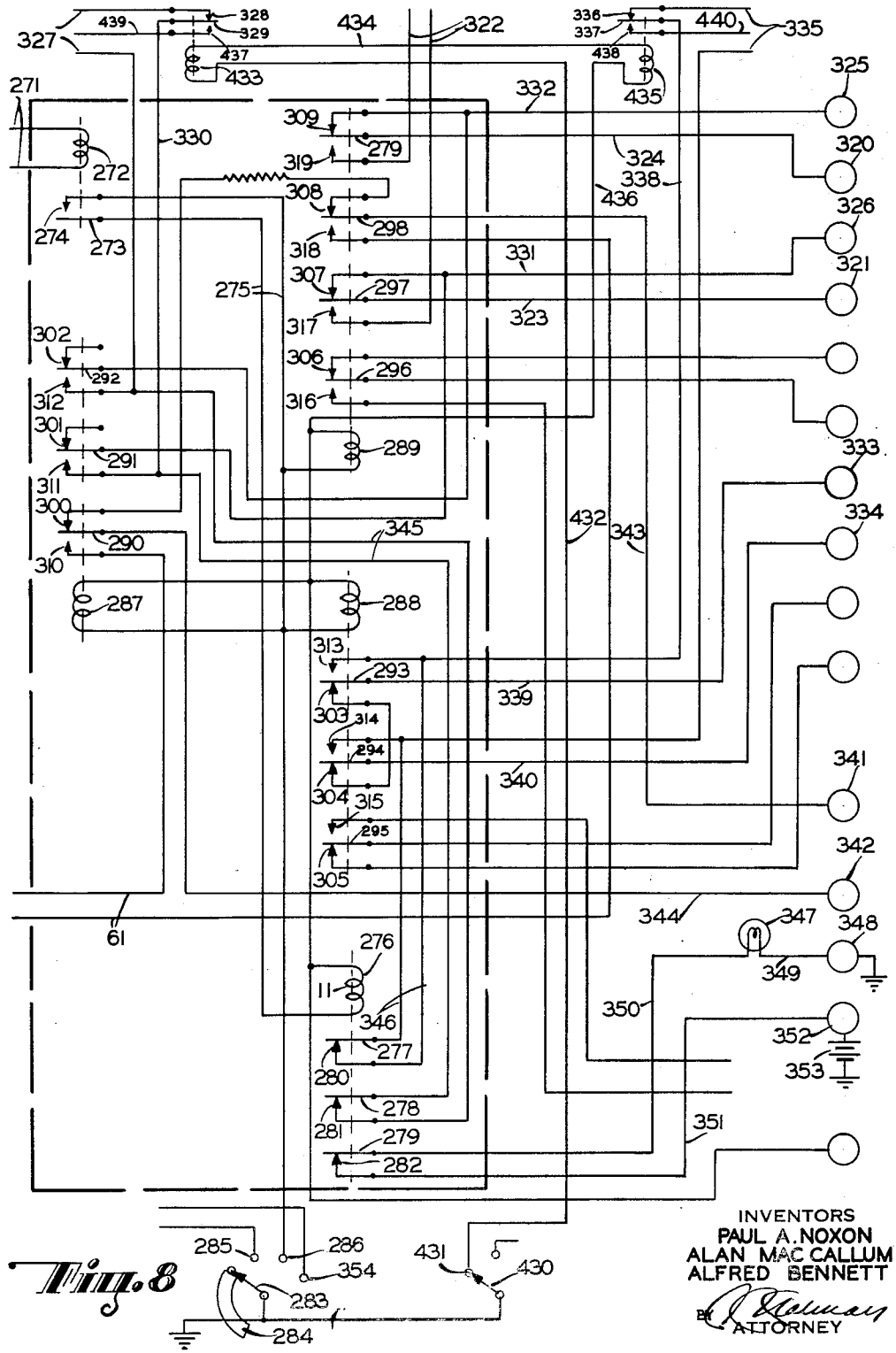
Figure 8 is a wiring diagram of a relay arrangement determining the connections between the flight path computer unit and the rudder and aileron channels; and, Figure 9 is a wiring diagram of a relay arrangement determining the various connections between the glide path computer unit and the elevator and throttle control channels.

In the event that a failure occurs in some part of the computer network, tube 167 of unit 59, for example, would be passing too high a signal into the rudder and aileron channels of the automatic pilot which is undersirable. To the end that this condition, if it occurs, may be prevented, a safety device is provided in the nature of a double amplifier tube 265 (Figure 6), having a first grid 266 coupled with the grids 165 and 166 of tube 167 by way of a lead 267, the related plate 268, in turn, being connected with a grid 269 whose related plate 270 is in circuit by way of leads 271 with a solenoid coil 272 (Figure 8).

Normal current flow at plate 270 of tube 265 energizes coil 272 to close a relay armature 273 with a fixed contact 274, the two being connected by way of leads 275 with a solenoid coil 276 whereby the latter is also energized to normally maintain relay armatures 277, 278 and 279 out of engagement with related contacts 280, 281 and 282. The foregoing result will be achieved when a grounded sequence switch 283, carrying a contact segment 284, has been set on power terminal 285.

Assuming switch 283 to have been moved to a localizer terminal 286, additional solenoid coils 287, 288 and 289 will have been energized to lift their related armatures 290, 291, 292, and 293, 294, 295 together with 296, 297, 298, 299 from one set of fixed contacts 300, 301, 302, 303, 304, 305, 306, 307, 308, and 309 to a second set of fixed contacts 310, 311, 312, 313, 314, 315, 316, 317, 318 and 319. In this manner the signal of compass 22 is fed into computer unit 59 by way of leads 63 (Figure 1) which connect with terminals 320 and 321 of Figure 8. These terminals connect with terminals 202 of Figure 6 by way of leads 322 through leads 323, 324, armature relays 297, 299 and contacts 317, 319. By virtue of this provision, the compass signal instead of being fed directly to the rudder channel 33 by way of leads 32 is fed into the computer unit, when the latter is engaged with the automatic pilot, by way of leads 63 to be mixed with the signals of the integration devices for rudder and aileron control.

Under the foregoing condition, the signal from the computer 59 for rudder control is fed to terminals 325 and 326, connected through leads 64 with the rudder channel amplifier, by way of leads 327, a fixed contact 328 which is engaged by an armature 329, lead 330, fixed contacts 311, 312, armatures 291, 292 and leads 331 and 332 while the signal from the same computer for aileron control is fed to terminals 333 and 334, connected through leads 65 with the aileron channel amplifier, by way of leads 335, a fixed contact 336, which is engaged by an armature 337, lead 338, fixed contacts 313, 314, armatures 293, 294 and leads 339, and 340.

The direct current signal communicated to control coils 107, 108 of device 87 of the computer from cross pointer coil 13 is conducted by way of leads 62 to terminals 341 and 342, the latter connecting with leads 61 (Figure 6) by way of a lead 343, armature 298, fixed contact 318 and lead 344, armature 290 and fixed contact 310.

In the event that a failure does occur in the computer network, the voltage on grid 269 of tube 265 (Figure 6) increases so that substantially no current is available at plate 270 whereupon solenoid coil 272 is deenergized and armature 273 disengages contact 274 and, simultaneously, solenoid coil 276 is deenergized to close its armatures 277, 278 and 279 with contacts 280, 281 and 282. In this manner, the closing of armature 278 and contact 281 places a short across leads 327 and 330, carrying the rudder signal from the computer unit, by way of leads 345 so that the computer signal cannot pass to the rudder channel amplifier while the closing of armature 277 and contact 280 places a short across leads 335 and 338, carrying the aileron signal from the computer, by way of leads 346 so that the computer signal cannot pass to the aileron channel amplifier.

At the same time, closure of armature 279 with contact 282 closes a circuit to a warning lamp 347, the latter being connected with a grounded terminal 348 by way of a lead 349 and with armature 279 by way of a lead 350, contact 282, on the other hand, connecting through a lead 351 and terminal 352 with a battery 353. In this manner, in the case of a failure in the computer network, warning lamp 347 glows to indicate the failure visually while the computer output is prevented from communicating, at that time, with the rudder and aileron control channels.

In order to fly a glide path beam as well as the localizer beam, switch 283 is turned to engage glide path terminal 354 (Figure 9) which places solenoid coils 355, 356 and 357 across the power supply by way of conductor 358 whereby the latter are energized to engage armatures 359, 360 and 361 with fixed contacts 362, 363 and 364, the armatures having normally engaged contacts 365, 366 and 367 and armatures 368, 369 and 370 with fixed contacts 371, 372 and 373, these armatures having normally engaged contacts 374, 375 and 376 as well as armatures 377, 378, 379 and 380 with fixed contacts 381, 382, 383 and 384, the latter armatures normally engaging contacts 385, 386, 387 and 388.

In a manner similar to computer unit 59, computer 60 is also provided with a safety device in the form of a tube 389 (Figure 7) whose grid 390 is coupled by way of a lead 391 with grids 246 and 247 of tube 248. With switch 283 on power terminal 285, normal plate current is available at plate 392 which is connected by leads 393 with a solenoid coil 394 for energizing the latter whereby an armature 395 is brought into normal engagement with a fixed contact 396, the latter both being connected through leads 397 to energize a further solenoid coil 398 which, in turn, lifts armatures 399, 400 and 401 from their fixed contacts 402, 403 and 404.

Figure 9:
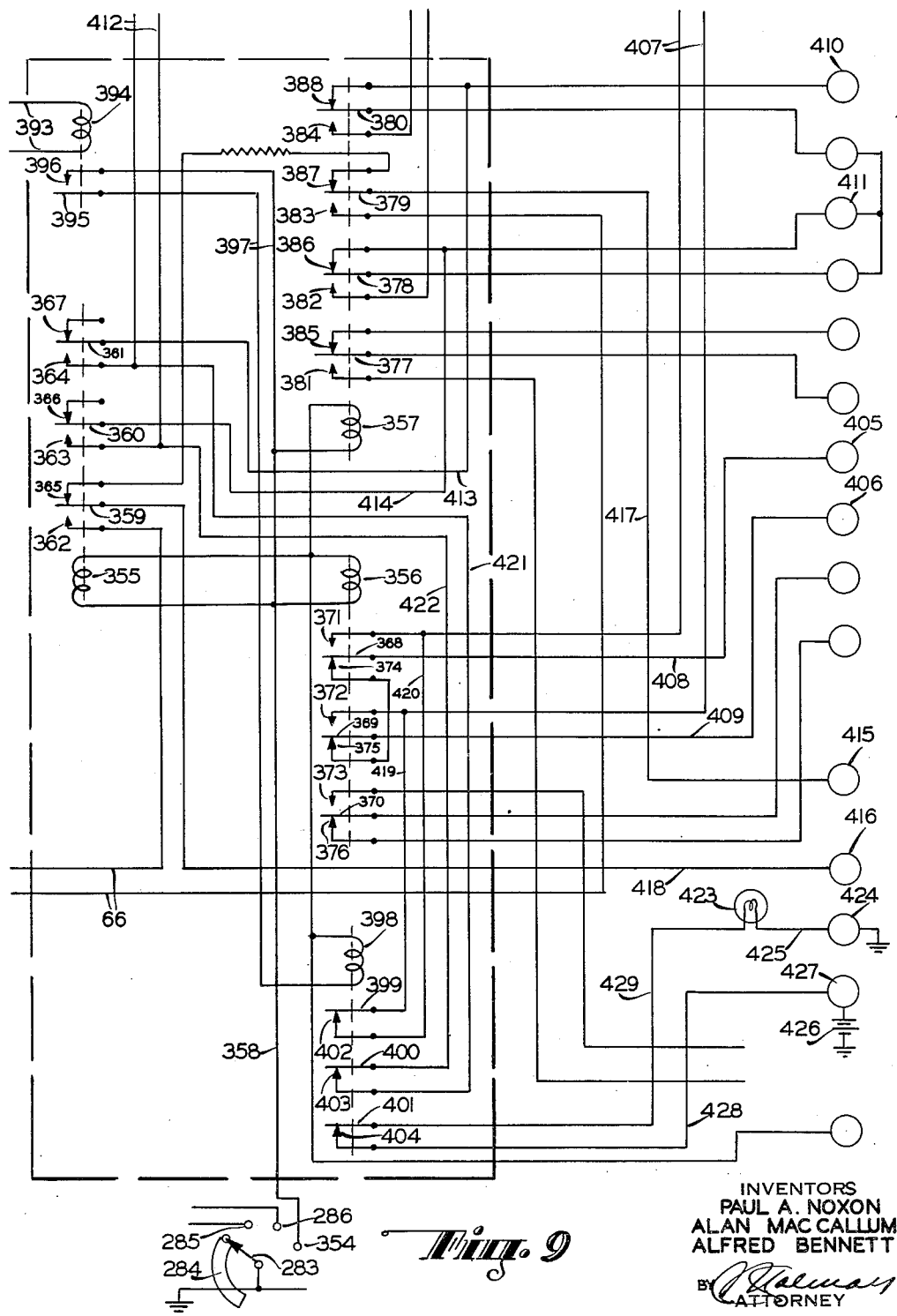

Under normal operating conditions, therefore, the output of the glide path computer unit is fed through transformer 249 of Figure 7 to terminals 405 and 406 of Figure 9, which connect by way of leads 68 (Figure 1) with the elevator channel amplifier, by way of leads 407, contacts 371, 372, armatures 368, 369 and leads 408 and 409 while the computer signal for throttle control is fed through transformer 250 of Figure 7 to terminals 410 and 411 of Figure 9, which connect by way of leads 73, 74 (Figure 1) with the throttle amplifiers, by way of leads 412, contacts 363, 364, armatures 360, 361 and leads 413 and 414.

The signal energizing coil 17 of the cross pointer is fed by way of leads 67 (Figure 1) to terminals 415 and 416 of Figure 9, the latter connecting with leads 66, connected to control coils 232 and 233 of Figure 7, by way of leads 417, 418, armatures 379, 359 and contacts 383, 362 with the leads 66.

In the event that a failure occurs in the network of computer unit 60, the grids of tube 389 will be driven so positive that they will start rectifying thus starving the plate of electrons so that substantially no current will flow at its plate 392 whereupon solenoid coil 394 will be deenergized to open armature 395 with contact 396. As a result solenoid coil 398 will likewise deenergize closing armatures 399, 400 with contacts 402, 403 thereby placing a short across leads 407 by way of leads 419, 420 to prevent the computer signal from passing to terminals 405, 406 leading to the elevator channel amplifier and a second short across leads 412 by way of leads 421, 422 to prevent the computer signal from passing to terminals 410, 411 leading to the throttle amplifiers. Simultaneously, the closing of armature 401 with contact 404 causes a warning lamp 423 to glow indicating visually that a failure has occurred in the network, one side of the lamp connecting with a grounded terminal 424 by way of a lead 425 and the other side thereof connecting with a battery 426 through a terminal 427, lead 428, contact 404, armature 401 and a lead 429.

The flight computer unit, above described, is adapted for range flying as well as for flying the localizer path. Inasmuch as the craft travels at a higher speed during range flying it is desirable to utilize only a portion of the computer unit for rudder and aileron control. To this end a selector switch 430 (Figure 8) is provided which for range flying is turned to range terminal 431, the latter connecting through a lead 432 with a solenoid coil 433, the free end of which is connected by way of a lead 434 with a solenoid coil 435, the latter connecting through a lead 436 with a suitable source of power. As solenoid coils 433 and 435 are energized, they move armatures 329 and 337 into engagement with fixed contacts 437 and 438 which connect with leads 439 and 440 (Figure 6) for conveying only a portion of the computer signals to rudder and aileron terminals 325, 326 and 333, 334.

Inasmuch as the resultant signal of the integration devices of both computer units will not start to decay until the localizer and glide path beams have been crossed, the time of decay may cover some period to direct the craft undesirably beyond either one or both of the beams. The decay period, as will now be understood, will not start until the signals in coils 13 and 17 of the cross pointer have dropped to zero indicating that the craft at that instant is crossing both beams. To the end that the decay of the signal of the integration devices may be speeded up to prevent the craft from going beyond either or both of the beams an undesirable distance after a crossing, a novel anticipatory control is further provided in the nature of a double amplifier comprising tubes 441 and 442 (Figure 6) and tubes 443 and 444 (Figure 7). These tubes are so biased that a portion of the computer signals is fed into their grids 445 and 446 by way of leads 267 and 391, the plate circuits of tubes 441 and 443 supplying, through transformers 447, 448 and leads 449 and 450, signals to the secondary windings of devices 87 and 230 which are 180° out of phase with the signals in those windings developed by the direct current in the coils of the cross pointer. By virtue of this provision, a point will be reached before the first crossing of the beams where signals due to the radio signals are still available at the secondaries of devices 87 and 230 but the signals of tubes 441 and 443 will become equal to these signals and since the feed back signals are of opposite phase the resultant signals at the secondaries and tubes 110 and 235 will be zero so that the resultant signal of the integration devices will start to decay even though the beams have not yet been crossed. In a sense, therefore, due to the feed-back devices just described arbitrary beams are set up to speed up craft arrival on to the desired radio beams.

In flying an aircraft equipped with the above-described novel apparatus from one airport to another, the human pilot may first fly on visual range between the stations and then make an automatic approach on the localizer and glide path beams. After the take-off, the radio is tuned to the frequency of the visual range and the craft is flown to intersect or bracket the beam, this condition being evidenced when vertical pointer 15 of the cross pointer indicator is at zero. Thereafter, sequence switch 283 is moved to power terminal 285 (Figure 8) for a a "warm-up" interval and selector switch 430 is moved to range terminal 431. When the craft is in the desired position with respect to the beam, sequence switch 283 is moved to localizer terminal 286 and the craft will be automatically flown down the visual range system to its destination. As the craft approaches its destination and it is desired to go into the automatic approach procedure, sequence switch 283 is turned back to power terminal 285 to disengage localizer control, leaving the craft under the control of the automatic pilot. Selector switch 430 is thereafter turned away from range terminal 431 and the radios are tuned to the frequencies of the approach system. The speed of the craft is then reduced to approach speed and the localizer beam is bracketed at which time sequence switch 283 is turned to localizer terminal 286. Thereafter the craft is flown to intersect the glide beam and when the latter is intersected switch 283 is moved to glide path terminal 354. The craft is then landed automatically.

As will now be apparent to those skilled in the art, a novel and desirable apparatus has been provided for automatically guiding an aircraft in two planes and landing it at its destination, the system being of such character as to utilize the amount of displacement of the craft from either or both of the beams rather than the angle of such displacement and the time that such displacement from the beam persists.

Although but one embodiment of the invention has been illustrated and described in detail, various changes and modifications in the form and relative arrangement of parts, which will now appear to those skilled in the art, may be made without departing from the scope of the invention. Reference is therefore to be had to the appended claims for a definition of the limits of the invention.

What is claimed is:

1. Apparatus for automatically guiding an aircraft toward a fixed point, comprising means for receiving on said aircraft radiant energy transmitted from said fixed point to provide a flight path for said aircraft toward said fixed point, means operative during craft displacement from said flight path for deriving from said received energy, notwithstanding the amount of craft displacement from said flight path, a substantially constant magnitude signal whose polarity is determined by the direction of craft displacement from said flight path, means for deriving from said signal a control potential whose magnitude is determined by the time of persistence of said signal, and means responsive to said control potential for controlling the flight of said aircraft along said flight path toward said fixed point.

2. Apparatus for automatically guiding an aircraft toward a predetermined point and for landing it on the ground at said point, comprising means for receiving on said aircraft radiant energies transmitted from said predetermined point in horizontal and vertical planes, respectively, to provide a descending flight path for said aircraft in a predetermined direction toward said predetermined point, means for deriving from each of said received energies separate substantially constant magnitude control signals the polarities of which are representative of the direction of craft displacement relative to said flight path in said horizontal and vertical planes, means for deriving from said signals control potentials whose magnitudes are determined by the time of persistence of said signals, and means responsive to said control potentials for controlling the flight of said aircraft along said descending flight path toward said fixed point until said aircraft lands on the ground automatically at said fixed point.

3. Apparatus for automatically landing an aircraft at a predetermined location on the ground by means of radiant energies transmitted from the ground in horizontal and vertical planes, respectively, to provide a descending flight path for said aircraft in a predetermined direction toward said location, said apparatus comprising means for separately receiving said transmitted energies on the aircraft, means for deriving separate substantially constant magnitude control signals from said received energies, one for controlling the aircraft in azimuth and the other for controlling it in descent to bring it onto said descending flight path and to maintain it thereon, the polarities of said signals being determined by the direction of craft displacement in two planes relative to said flight path, and means for deriving from said control signals control potentials whose magnitudes are determined by the time of persistence of said signals, the time of persistence of said signals, in turn being determined by the length of time that the aircraft is displaced in both horizontal and vertical planes from the descending flight path.

4. Apparatus for automatically landing an aircraft at a predetermined point on the ground, comprising means for receiving radiant energy on said aircraft from a transmitter located on the ground at said predetermined point and transmitting said radiant energy in a vertical plane in space to form a field pattern providing a glide path for said aircraft toward said point on the ground, means for deriving from said received energy a substantially constant magnitude control signal having a polarity determined by the direction of craft displacement relative to said glide path, means for deriving from said control signal a control potential whose magnitude is determined by the time of persistence of said control signal, and means responsive to said control potential for controlling the flight of said aircraft along said glide path to said predetermined point on the ground.

5. Apparatus for automatically landing, at a predetermined location on the ground by means of radio signals transmitted from said location, an aircraft having an automatic pilot thereon including means responsive to changes in the heading of the craft and means responsive to the bank and pitch of said craft for controlling the craft about its three axes, and also having radio receiving means thereon for receiving said radio signals to provide a guiding descending flight path for said aircraft toward said predetermined location, said apparatus comprising means for deriving separate substantially constant magnitude control signals from said received radio signals whose polarities are determined by the direction of the horizontal and vertical displacements of said aircraft from said flight path, means for deriving from said control signals control potentials whose magnitudes are determined by the time of persistence of said control signals, and means responsive to said control potentials adapted to operate the rudder and elevator of said aircraft through said automatic pilot to guide said aircraft along said flight path toward and to land it at said predetermined location.

6. Apparatus for automatically guiding, toward a predetermined point by means of radio signals transmitted from said point, an aircraft having automatic steering means thereon including means responsive to changes in the heading of said craft for maintaining said craft on said heading, and also having radio receiving means thereon for receiving said signals to provide a flight path for said aircraft toward said predetermined point, said apparatus comprising means for deriving a substantially constant magnitude control signal from said received signals having a polarity determined by the direction of craft displacement relative to said flight path, means for deriving from said control signal a control potential whose magnitude is determined by the time of persistence of said control signal, and means responsive to said control potential adapted to operate the rudder of said aircraft through said automatic steering means to guide said aircraft along said flight path toward said predetermined point.

7. Apparatus for automatically guiding, toward a predetermined point by means of radio signals transmitted from said point, an aircraft having an engine throttle control thereon for controlling the speed thereof and automatic steering means thereon including means responsive to changes in the attitude of said craft for maintaining said craft in level attitude together with radio receiving means thereon for receiving said signals to provide a glide path for said aircraft toward said predetermined point, said apparatus comprising means for deriving a substantially constant magnitude control signal from said received signals having a polarity determined by the direction of craft displacement relative to said guide path, means for deriving from said control signal a control potential whose magnitude is determined by the time of persistence of said control signal, and means responsive to said control potential adapted to operate the elevator of said aircraft through said automatic steering means as well as said engine throttle control to guide said aircraft along said glide path toward said predetermined point.

8. Apparatus for automatically guiding, toward a predetermined point by means of radio signals transmitted from said point, an aircraft having an engine throttle control thereon for controlling the speed thereof and automatic steering means thereon including means responsive to changes in attiutde of said craft for maintaining said craft in level attitude together with radio receiving means thereon for receiving said signals to provide a glide path for said aircraft toward said predetermined point, said apparatus comprising a glide path computer unit having an input and an output, the input of said unit being connected to said radio receiving means for deriving from said received signals a substantially constant magnitude control signal whose polarity is determined by the direction of craft displacement from said glide path, means operated by said control signal for developing a control potential of a magnitude determined by the time of persistence of said control signal, means connected to the output of said unit and responsive to said control potential adapted to operate the elevator of said aircraft through said automatic steering means, and means connected to the output of said unit also responsive to said control potential adapted to operate said engine throttle control.

9. Apparatus for automatically controlling the speed of the engine of an aircraft by means of radio signals transmitted from a ground station to guide the aircraft toward a predetermined point, the aircraft having an engine throttle control thereon together with radio receiving means for receiving said signals to provide an inclined flight path for said aircraft, said apparatus comprising means for deriving a substantially constant magnitude control signal from said received signals having a polarity determined by the direction of craft displacement from said flight path, means for deriving from said control signal a control potential having a magnitude determined by the time of persistence of said control signal, and means responsive to said control potential adapted for actuating said throttle control.

10. Apparatus for automatically controlling the speed of the engine of an aircraft by means of radio signals transmitted from a ground station to guide the aircraft toward a predetermined point, the aircraft having an engine throttle control thereon together with radio receiving means for receiving said signals to provide an inclined flight path for said aircraft, said apparatus comprising a computer unit connected to said radio receiving means and having means for deriving from said received signals a substantially constant magnitude control signal having a polarity determined by the direction of craft displacement from said flight path together with means for developing from said control signal a control potential whose magnitude is determined by the time of persistence of said control signal, and means connected to said computer unit and responsive to said control potential adapted for operating said throttle control.

11. Apparatus for automatically guiding an aircraft toward a fixed point, comprising means for receiving on said aircraft radiant energy transmitted from said fixed point to provide a flight path for said aircraft toward said fixed point, a computer unit connected to said first-named means and having means for deriving from said received energy a substantially constant magnitude control signal whose polarity is determined by the direction of displacement of the craft from said flight path together with means for developing from said control signal a control potential whose magnitude depends upon the time of persistence of said control signal, and means connected to said computer unit and responsive to said control potential for controlling the flight of said aircraft along said flight path toward said fixed point.

12. Apparatus for automatically guiding an aircraft toward a fixed point, the aircraft having thereon means for receiving radiant energy transmitted from said fixed point to provide a flight path for said aircraft toward said fixed point, comprising a computer unit having an input and an output, the input of said unit being connected to said receiving means for deriving from said received energy a substantially constant magnitude control signal whose polarity is determined by the direction of craft displacement from said flight path and for deriving from said control signal a control potential having a magnitude dependent upon the time of persistence of said control signal, means connected to the output of said computer unit and responsive to said control potential for controlling the flight of said aircraft along said flight path toward said fixed point, and feed-back means interconnected between the input and output of said computer unit.

13. Apparatus for automatically guiding an aircraft toward a fixed point, the aircraft having thereon means for receiving radiant energy transmitted from a ground station to provide a flight path for said aircraft toward said fixed point, comprising means for deriving from said received energy when said craft is displaced from said flight path a substantially constant magnitude potential, means for integrating said potential to provide a resultant signal as a function of the time of persistence of said potential, the time of persistence of said potential being a function of the amount of aircraft displacement from said flight path, and means responsive to said resultant signal for controlling the flight of said aircraft along said flight path toward said fixed point.

14. Apparatus for automatically guiding an aircraft having an automatic pilot thereon together with means for receiving energy transmitted from a ground station to provide a predetermined path for said aircraft toward a fixed point, comprising means for deriving from said received energy when said craft is displaced from said flight path a substantially constant magnitude potential, means for integrating said potential to provide a resultant signal as a function of the time of persistence of said potential, and means responsive to said resultant signal adapted to operate said automatic pilot to guide said aircraft along said path.

15. Apparatus for automatically guiding an aircraft having an automatic pilot thereon together with means for receiving energy transmitted from a ground station to provide a predetermined path for said aircraft toward a fixed point, comprising means for deriving from said received energy when said craft is to one side or the other of said path a substantially constant magnitude potential, means comprising a thermionic tube for integrating said potential to provide a resultant signal as a function of the time of persistence of said potential, and means responsive to said resultant signal adapted to operate said automatic pilot to guide said aircraft along said path.

16. Apparatus for automatically guiding an aircraft having an automatic pilot thereon together with means for receiving energy transmitted from a ground station to provide a predetermined path for said aircraft toward a fixed point, comprising means for deriving from said received energy when said craft is to one side or the other of said path a substantially constant magnitude potential, means comprising a time delay device for integrating said potential to provide a resultant signal as a function of the time of persistence of said potential, and means responsive to said resultant signal adapted to operate said automatic pilot to guide said aircraft along said path.

17. Apparatus for automatically guiding an aircraft having an automatic pilot thereon together with means for receiving energy transmitted from a ground station to provide a predetermined path for said aircraft toward a fixed point, comprising means for deriving from said received energy when said craft has been displaced from said path a substantially constant magnitude potential, means comprising a thermal delay device for integrating said potential to provide a resultant signal as a function of the time of persistence of said potential, and means responsive to said resultant signal adapted to operate said automatic pilot to guide said aircraft along said path.

18. Apparatus for automatically guiding an aircraft having an automatic pilot thereon together with means for receiving energy transmitted from a ground station to provide a predetermined path for said aircraft toward a fixed point, comprising means for deriving from said received energy when the craft is displaced from said path a substantially constant magnitude potential, means comprising a plurality of thermal delay devices for integrating said potential to provide a resultant signal as a function of the time of persistence of said potential, and means responsive to said resultant signal adapted to operate said automatic pilot to guide said aircraft along said path.

19. Apparatus for automatically guiding an aircraft having an automatic pilot thereon together with means for receiving energy transmitted from a ground station to provide a predetermined path for said aircraft toward a fixed point, comprising means for deriving from said received energy when said craft is displaced from said path a substantially constant magnitude potential having a polarity determined by the direction of craft displacement relative to said path, means comprising a plurality of interconnected electrical devices having different time-constants for integrating said potential to provide a resultant signal as a function of the time of persistence of said potential, and means responsive to said resultant signal adapted to operate said automatic pilot to guide said aircraft along said path.

20. Apparatus for automatically guiding an aircraft having an automatic pilot thereon together with means for receiving energy transmitted from a ground station to provide a predetermined path for said aircraft toward a fixed point, comprising means for deriving from said received energy when said craft is displaced from said path a substantially constant magnitude potential, means comprising a thermionic tube and interconnected thermal delay devices for integrating said potential to provide a resultant signal as a function of the time of persistence of said potential, and means responsive to said resultant signal adapted to operate said automatic pilot to guide said aircraft along said path.

21. Apparatus for automatically guiding an aircraft having an automatic pilot thereon together with means for receiving energy transmitted from a ground station to provide a predetermined path for said aircraft toward a fixed point, comprising means for deriving from said received energy when said craft is displaced from said path a substantially constant magnitude potential, thermionic means connected to receive said potential, a delay circuit having a predetermined time constant connected between said thermionic means and said control potential whereby said potential is integrated to provide a resultant signal which is a function of the time of persistence of said potential, and means responsive to said resultant signal adapted to operate said automatic pilot to guide said aircraft along said path.

22. Apparatus for automatically guiding an aircraft having an automatic pilot thereon together with means for receiving energy transmitted from a ground station to provide a predetermined path for said aircraft toward a fixed point, comprising thermionic means for deriving from said received energy when said craft is displaced from said path a substantially constant magnitude potential, integrating means comprising a vacuum tube and at least one thermal delay tube connected to said potential for integrating the latter to provide a resultant signal which is a function of the time of persistence of said potential, and means responsive to said resultant signal adapted to operate said automatic pilot to guide said aircraft along said path.

23. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced from said path an alternating current proportional to said received energy, means connected to said device for developing a substantially constant magnitude potential from said alternating current having a polarity determined by the direction of craft displacement relative to said path, integrating means connected with said last-named means for developing from said potential a control signal whose magnitude is determined by the time of persistence of said potential, and means responsive to said control signal adapted to operate said automatic pilot to guide said aircraft along said path.

24. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced from said path an alternating current proportional to said received energy, means connected to said device for developing a substantially constant magnitude potential from said alternating current having a polarity determined by the direction of craft displacement relative to said path, integrating means comprising at least one delay device having a predetermined time constant connected with said last-named means for developing from said potential a control signal whose magnitude is determined by the time of persistence of said potential, and means responsive to said central signal adapted to operate said automatic pilot to guide said aircraft along said path.

25. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced from said path an alternating current proportional to said received energy, means connected to said device for developing a substantially constant magnitude potential from said alternating current having a polarity determined by the direction of craft displacement relative to said path, integrating means comprising a plurality of delay devices having different time constants connected with said last-named means for deriving from said potential a control signal whose magnitude is determined by the time of persistence of said potential, and means responsive to said control signal adapted to operate said automatic pilot to guide said aircraft along said path.

26. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced from said path an alternating current proportional to said received energy, means connected to said device for developing a substantially constant magnitude potential from said alternating current having a polarity determined by the direction of craft displacement from said path, integrating means connected with said last-named means for developing from said potential a control signal whose magnitude is a function of the time of persistence of said potential, means responsive to said control signal adapted to operate said automatic pilot to guide said aircraft along said path, and means for modifying said alternating current in accordance with said control signal.

27. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced relative to said path an alternating current proportional to said received energy, means connected to said device for developing a substantially constant magnitude potential from said alternating current having a polarity determined by the direction of craft displacement relative to said flight path, integrating means connected with said last-named means for developing from said potential a control signal whose magnitude is determined by the time of persistence of said potential, means responsive to said control signal adapted to operate said automatic pilot to guide said aircraft along said path, and electrical feed back means connected to said device for modifying said alternating current in accordance with said control signal.

28. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced from said path an alternating current proportional to said received energy, means connected to said device for developing a substantially constant magnitude potential from said alternating current having a polarity determined by the direction of craft displacement relative to said path, integrating means connecting with said last-named means for developing from said potential a control signal whose magnitude is determined by the time of persistence of said potential, means responsive to said control signal adapted to operate said automatic pilot to guide said aircraft along said path, and thermionic means connected with said device and said control signal for feeding back to said device a portion of said control signal.

29. Apparatus for automatically guiding an aircraft having an automatic pilot thereon together with means for receiving energy transmitted from a ground station to provide a predetermined path for said aircraft toward a fixed point, said apparatus comprising a device connected to said energy receiving means for developing when said craft is displaced from said path an alternating current having a polarity representative of the direction of craft displacement relative to said path proportional to said received energy, means connected to said device for developing a substantially constant magnitude potential from said alternating current, integrating means connected with said last-named means for developing from said potential in accordance with and a control signal whose magnitude is determined by the time of persistence of said potential, means responsive to said control signal adapted to operate said automatic pilot to guide said aircraft along said path, and feed-back means connected with said device and said control signal for feeding back to said device a portion of said control signal out of phase with said alternating current.

30. Apparatus for automatically guiding an aircraft in azimuth in accordance with radio signals transmitted from a ground station, the aircraft being provided with an automatic pilot thereon including means responsive to changes in the heading of the aircraft for providing a control signal for rudder actuation together with radio means for receiving said radio signals to provide a localizer path for said aircraft, said apparatus comprising means for deriving a second substantially constant magnitude control signal from said radio signals having a polarity determined by the direction of craft displacement relative to said path, means for developing from said second control signal a control potential whose magnitude is determined by the time of persistence of said second control signal, means responsive to said control potential adapted to operate the rudder of said aircraft through said automatic pilot to guide the craft along the localizer path, and means for algebraically combining said control potential and the control signal developed by said heading responsive means to determine the rate of turn of the craft to the localizer path when the aircraft has departed from said path.

31. Apparatus for automatically guiding an aircraft in azimuth in accordance with radio signals transmitted from a ground station, the aircraft being provided with an automatic pilot thereon including means responsive to changes in the heading of the aircraft and rate of change of heading means for providing control signals for rudder actuation together with radio means for receiving said radio signals to provide a localizer path for said aircraft, said apparatus comprising means for deriving a further substantially constant magnitude control signal from said radio signals having a polarity representative of the direction of craft displacement relative to said path, means for developing from said further control signal a control potential whose magnitude is determined by the time of persistence of said further control signal, means responsive to said control potential adapted to operate the rudder of said aircraft through said automatic pilot to guide the craft along the localizer path, and means for algebraically combining said potential and the control signals developed by said change of heading responsive means and said rate of change of heading responsive means to determine the rate of turn of the craft to the localizer path when the aircraft has departed from said path.

32. In an automatic steering system for a vehicle having a control surface movable with respect thereto for controlling said vehicle about an axis thereof, a servo motor for operating said surface, radiant energy receiving means on said vehicle for generating a signal in response to a departure of said vehicle from a predetermined position, means for developing a substantially constant magnitude control potential from said signal, and a time delay device energized by said control potential for operating said servo motor.

PAUL A. NOXON.
ALAN M. MacCALLUM.
ALFRED BENNETT.

REFERENCES CITED

The following references are of record in the file of this patent:

UNITED STATES PATENTS

| Number | Name | Date |
|---|---|---|
| 1,966,170 | Greene | July 10, 1934 |
| 2,133,285 | Dunmore | Oct. 18, 1938 |
| 2,364,624 | Dugan | Dec. 12, 1944 |
| 2,382,709 | Greene et al. | Aug. 14, 1945 |
| 2,419,970 | Roe et al. | May 6, 1947 |
| 2,423,336 | Moseley | July 1, 1947 |
| 2,423,337 | Moseley | July 1, 1947 |
| 2,425,131 | Snyder | Aug. 5, 1947 |
| 2,425,405 | Vance | Aug. 12, 1947 |

FOREIGN PATENTS

| Number | Country | Date |
|---|---|---|
| 832,946 | France | Oct. 6, 1938 |